(12) United States Patent
Cozma et al.

(10) Patent No.: US 12,556,579 B2
(45) Date of Patent: Feb. 17, 2026

(54) USING A WEBSOCKET CONNECTION TO SEND MESSAGES FROM AN OFF-PREMISES NODE TO AN ON-PREMISES NODE

(71) Applicant: Lenovo Enterprise Solutions (Singapore) Pte Ltd., Singapore (SG)

(72) Inventors: Alexandru Cozma, Bucharest (RO); Jeffery J Van Heuklon, Rochester, MN (US)

( * ) Notice: Subject to any disclaimer, the term of this patent is extended or adjusted under 35 U.S.C. 154(b) by 228 days.

(21) Appl. No.: 17/957,159

(22) Filed: Sep. 30, 2022

(65) Prior Publication Data

US 2024/0114054 A1     Apr. 4, 2024

(51) Int. Cl.
    *H04L 9/40*    (2022.01)

(52) U.S. Cl.
    CPC ........ *H04L 63/168* (2013.01); *H04L 63/0236* (2013.01); *H04L 63/029* (2013.01); *H04L 63/166* (2013.01)

(58) Field of Classification Search
None
See application file for complete search history.

(56) References Cited

U.S. PATENT DOCUMENTS

2014/0237585 A1* 8/2014 Khan .................. H04L 63/0272
    726/15

2016/0241633 A1* 8/2016 Overby, Jr. ............. H04L 67/02
2017/0171289 A1* 6/2017 Fausak .................. H04L 67/025

OTHER PUBLICATIONS

Firewall—Wikipedia (Year: 2020).*
Virtual Private Network & Tunneling—Wikipedia (Year: 2020).*
WebSocket—Wikipedia (Year: 2020).*
Feng, "Windows Firewall Blocks All Incoming Traffic by Default" (Year: 2020).*

* cited by examiner

*Primary Examiner* — Shirley X Zhang
(74) *Attorney, Agent, or Firm* — Jeffrey L. Streets

(57) ABSTRACT

A method includes establishing a WebSocket connection between an on-premises WebSocket application hosted on a first on-premises compute node and an off-premises WebSocket application hosted on a first off-premises compute node, wherein the first on-premises compute node is in an on-premises network having a firewall that prevents the first off-premises compute node from initiating a connection with the first on-premises compute node, and wherein the on-premises WebSocket application hosted on the first on-premises compute node initiates the establishing of the WebSocket connection with the off-premises WebSocket application hosted on the first off-premises compute node. The method further includes sending a message from a client application hosted on a second off-premises compute node to a server application hosted on a second on-premises compute node through the WebSocket connection, wherein the second off-premises compute node initiates the sending of the message to the second on-premises compute node.

18 Claims, 7 Drawing Sheets

*150*

```
┌─────────────────────────────────────────────────────────────────┐
│         Establishing a WebSocket connection between an on-premises         │
│       WebSocket application hosted on a first on-premises compute node and │
│     an off-premises WebSocket application hosted on a first off-premises compute │
│  node, wherein the first on-premises compute node is in an on-premises network │
│           having a firewall that prevents the first off-premises compute node from │— 152
│    initiating a connection with the first on-premises compute node, and wherein the │
│   on-premises WebSocket application hosted on the first on-premises compute node │
│         initiates the establishing of the WebSocket connection with the off-premises │
│           WebSocket application hosted on the first off-premises compute node │
└─────────────────────────────────────────────────────────────────┘
                                    │
                                    ▼
┌─────────────────────────────────────────────────────────────────┐
│      Sending a message from a client application hosted on a second off-premises │
│        compute node to a server application hosted on a second on-premises │
│         compute node through the WebSocket connection, wherein the second │— 154
│              off-premises compute node initiates the sending of the message │
│                        to the second on-premises compute node │
└─────────────────────────────────────────────────────────────────┘
```

*FIG. 5*

USING A WEBSOCKET CONNECTION TO SEND MESSAGES FROM AN OFF-PREMISES NODE TO AN ON-PREMISES NODE

BACKGROUND

The present disclosure relates to communication between a compute node in an off-premises environment, such as a public cloud, and a compute node in an on-premises environment, such as a datacenter.

BACKGROUND OF THE RELATED ART

Communications between a compute node in a datacenter or other "on-premises" location and a compute node that is not in the datacenter or other on-premises location, such as a compute node in a cloud or other "off-premises" location, pose some challenges. For example, one main challenge is the ability for an off-premises compute node to initiate a connection with an on-premises compute node. The environment of a datacenter or other on-premises location may be extremely protected, such as having a firewall and a web proxy server, with networking rules that severely limit connections initiated from outside the protected on-premises environment.

BRIEF SUMMARY

Some embodiments provide a computer program product comprising a non-volatile computer readable medium and non-transitory program instructions embodied therein, the program instructions being configured to be executable by a processor on an on-premises compute node to cause the processor to perform various operations. The operations comprise hosting an on-premises Web Socket application and initiating establishment of a WebSocket connection from the on-premises Web Socket application to an off-premises Web Socket application hosted on a first off-premises compute node. The operations further comprise the on-premises WebSocket application receiving a first application layer message from the off-premises WebSocket application through the Web Socket connection, where the first application layer message encapsulates a first transport layer segment sent from a client application hosted on the first off-premises compute node or a second off-premises compute node and directed to an on-premises server application. Still further, the operations comprise forwarding the first transport layer segment from a transport layer client service associated with the on-premises WebSocket application through a transport layer socket to a transport layer server service associated with the on-premises server application.

Some embodiments provide a computer program product comprising a non-volatile computer readable medium and non-transitory program instructions embodied therein, the program instructions being configured to be executable by a processor on an on-premises compute node to cause the processor to perform various operations. The operations comprise hosting an off-premises Web Socket application that is an endpoint for a Web Socket connection between the off-premises WebSocket application and an on-premises WebSocket application hosted on a first on-premises compute node. The operations further comprise a transport layer server service associated with the off-premises WebSocket application receiving a first transport layer segment through a transport layer socket, wherein the transport layer segment is sent from an off-premises client application to an on-premises server application. Still further, the operations comprise the off-premises WebSocket application encapsulating the first transport layer segment into an application layer message and sending the application layer message to the on-premises Web Socket application through the Web Socket connection.

Some embodiments provide a method comprising establishing a WebSocket connection between an on-premises WebSocket application hosted on a first on-premises compute node and an off-premises WebSocket application hosted on a first off-premises compute node, wherein the first on-premises compute node is in an on-premises network having a firewall that prevents the first off-premises compute node from initiating a connection with the first on-premises compute node, and wherein the on-premises WebSocket application hosted on the first on-premises compute node initiates the establishing of the WebSocket connection with the off-premises WebSocket application hosted on the first off-premises compute node. The method further comprises sending a message from a client application hosted on a second off-premises compute node to a server application hosted on a second on-premises compute node through the Web Socket connection, wherein the second off-premises compute node initiates the sending of the message to the second on-premises compute node.

BRIEF DESCRIPTION OF THE SEVERAL VIEWS OF THE DRAWINGS

FIG. 5 is a flowchart of operations for a system including an on-premises compute node and an off-premises compute node.

DETAILED DESCRIPTION

Figure 1:
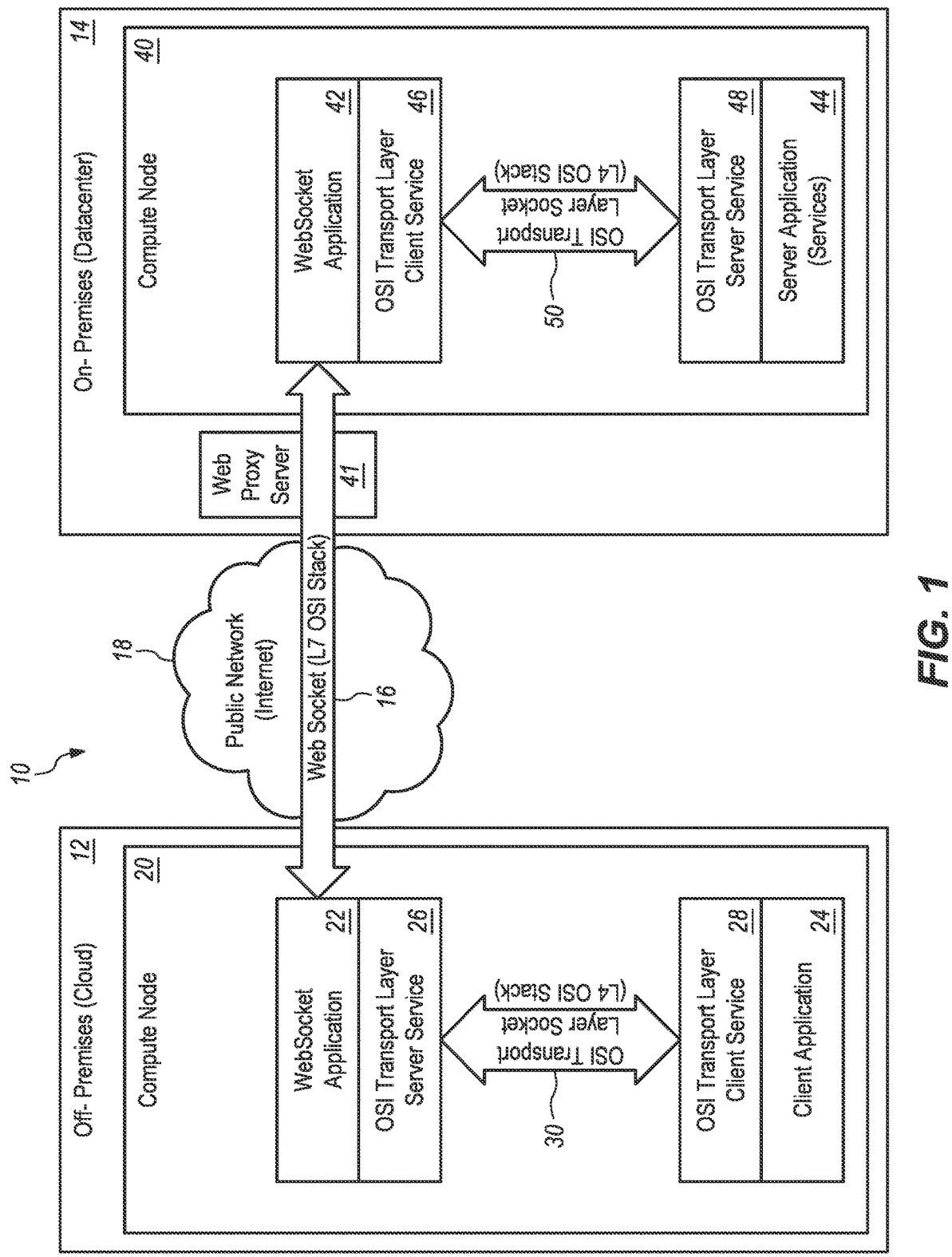
FIG. 1 is a diagram of a system including a compute node in an off-premises environment in communication with a compute node in an on-premises environment.

Some embodiments provide a computer program product comprising a non-volatile computer readable medium and non-transitory program instructions embodied therein, the program instructions being configured to be executable by a processor on an on-premises compute node to cause the processor to perform various operations. The operations comprise hosting an on-premises Web Socket application and initiating establishment of a WebSocket connection from the on-premises Web Socket application to an off-premises Web Socket application hosted on a first off-premises compute node. The operations further comprise the on-premises WebSocket application receiving a first application layer message from the off-premises WebSocket application through the Web Socket connection, where the first application layer message encapsulates a first transport layer segment sent from a client application hosted on the first off-premises compute node or a second off-premises compute node and directed to an on-premises server application. Still further, the operations comprise forwarding the first transport layer segment from a transport layer client service associated with the on-premises WebSocket application through a transport layer socket to a transport layer server service associated with the on-premises server application.

In reference to a compute node, a computing environment or software hosted by a compute node or computing environment, the terms "on-premises" and "off-premises" refer to a zone of protection. The zone of protection may be a physical zone, such as a building, datacenter, campus or facilities under common control, or the zone of protection may be a virtual zone, such as the hardware and software belonging to a designated network, networks, or range of network addresses. From the perspective of a system administrator responsible for the security of the on-premises compute node, environment and/or software, the term "off-premises" refers to any hardware or software that is not "on-premises" hardware or software. Accordingly, activity and/or communications from "off-premises" hardware and/or software entities may pose a potential security threat to the "on-premises" hardware and/or software. In some instances, a trusted "on-premises" system, such as a datacenter, may be separated from untrusted "off-premises" systems by a firewall and/or web proxy server that are responsible for monitoring and controlling incoming and outgoing network traffic based on predetermined security rules. In one option, a predetermined security rule is to prevent all incoming network connections or communications that have been initiated by "off-premises" hardware and/or software.

WebSocket is a computer communications protocol that is maintained by the Web Hypertext Application Technology Working Group (WHATWG). The WebSocket protocol provides full-duplex communication channels over a single Transmission Control Protocol (TCP) connection. "Full duplex communication" means that communication is allowed to occur simultaneously in both directions between two endpoints. Although the WebSocket protocol is distinct from the Hypertext Transfer Protocol (HTTP), both protocols are located at the application layer, such as layer 7 in the Open Systems Interconnection (OSI) model, and the WebSocket protocol is compatible with HTTP. The WebSocket protocol provides a standardized way for a server to send content to a client without being first requested by the client and allows messages to be passed back and forth between the server and client while keeping the connection open. In this way, a two-way ongoing conversation can take place between the client and the server. A WebSocket connection may be established between a WebSocket application on the server and a WebSocket application on the client, where the server is a compute node running a server application and the client is a compute node running a client application. Accordingly, either of the two Web Socket applications may send application layer messages over the Web Socket connection to the other of the two Web Socket applications.

In some embodiments, the application layer and transport layer may be implemented consistent with the Open Systems Interconnection (OSI) model. The OSI model describes seven (7) layers for the flow of data in a communication system. According to the OSI model, the lowest layer is the physical layer (layer 1) and the highest layer is the application layer (layer 7). Layer 4 describes a transport layer that provides the functional and procedural means of transferring variable-length data sequences from a source host to a destination host across a network. According to some embodiments, an OSI application layer (layer 7) message may encapsulate an OSI transport layer (layer 4) segment, whether that message is being sent from a client application hosted on an off-premises compute node to a server application hosted on an on-premises compute node or whether that message is being sent from a server application hosted on an on-premises compute node to a client application hosted on an off-premises compute node. Therefore, a WebSocket application hosted on one compute node may receive an OSI transport layer segment and encapsulate the segment into an OSI application layer message before sending the message over a Web Socket connection to another Web Socket application hosted on another compute node. Furthermore, a WebSocket application hosted on one compute node may receive an OSI application layer message with an OSI transport layer segment encapsulated within the message, extract the OSI transport layer segment and forward the OSI transport layer message to an application program.

Embodiments may further include sending a transport layer segment over a transport layer socket (such as in layer 4 of the OSI stack) between a transport layer client service and a transport layer server service. A particular transport layer segment may be sent over the transport layer socket in either direction, such as being sent from the transport layer client service to the transport layer server service or from the transport layer server service and a transport layer client service. Furthermore, one or more transport layer socket may exist in the on-premises environment and one or more transport layer socket may exist in the off-premises environment. For example, the on-premises environment may have one or more server applications hosted across one or more compute nodes, where each server application is associated with a transport layer server service that may communicate over a transport layer socket to a transport layer client service associated with a WebSocket application. Conversely, the off-premises environment may have one or more client applications hosted across one or more compute nodes, where each client application is associated with a transport layer client service that may communicate over a transport layer socket to a transport layer server service associated with a Web Socket application. The Web Socket between the on-premises WebSocket application and the off-premises WebSocket application supports full-duplex communication of messages between the two Web Socket applications, where the application layer messages sent over the WebSocket encapsulate transport layer segments that are being sent between one of the client applications and one of the server applications. It is a technological advantage that embodiments support communications between multiple client applications and multiple server applications over a single WebSocket. This is the case regardless of whether the client applications are hosted on the same compute node or multiple compute nodes in the off-premises environment and regardless of whether the server applications are hosted on the same compute node or multiple compute nodes in the on-premises environment.

The term "associated" is used herein to describe a relationship that enables direct communication between an application and a service, where the application and the associated service are hosted on the same compute node. For example, the application may open or initiate a service that the application needs to utilize to support communication with other applications. Opening or initiating the service may include providing a command to the operating system, such as the Linux operating system. Accordingly, a server application hosted on an on-premises compute node may interface with the operating system to open a transport layer server service so that the server application may send and receive segments with other applications, such as the on-premises Web Socket application. Similarly, the on-premises Web Socket application hosted on an on-premises compute node may interface with the operating system to open a transport layer client service so that the Web Socket application may send and receive segments with other on-premises applications, such as the server application. A client application hosted on an off-premises compute node may interface with the operating system to open a transport layer client service so that the client application may send and receive segments with other applications, such as the off-premises WebSocket application. Similarly, the off-premises WebSocket application hosted on an off-premises compute node may interface with the operating system to open a transport layer server service so that the off-premises Web Socket application may send and receive segments with other off-premises applications, such as the client application. Simply stated, the transport layer services support communication of transport layer segments between the applications hosted within a particular off-premises or on-premises environment, whereas the Web Socket applications support communication of application layer messages containing those transport layer segments between the off-premises and on-premises environments.

Each WebSocket application is able to encapsulate transport layer segments into an application layer message before sending the message over the Web Socket to the other Web Socket application. Conversely, each Web Socket application is able to de-encapsulate or extract transport layer segments from an application layer message after receiving the message over the Web Socket from the other Web Socket application. In this manner, the Web Socket application may be considered to perform both transport layer to application layer translations (i.e., L4 to L7 translations) and application layer to transport layer translations (i.e., L7 to L4 translations). In the context of some embodiments, the term "encapsulating" refers to the processes of inserting a transport layer segment into the payload (data portion) of an application layer message and the term "de-encapsulating" refers to the processes of extracting a transport layer segment from the application layer message. Communicating the transport layer segments from one endpoint to another endpoint as the data portion in an application layer message may be referred to as "tunneling."

A transport layer socket supports a two-way transport layer communication link between two programs running on a network, such as a local area network. The transport layer socket may be bound to a port number so that the transport layer can identify the application that data is destined to be sent to. The application may be identified by a combination of an Internet Protocol (IP) address and a port number.

In some embodiments, the on-premises compute node is included in an on-premises network that is separated from off-premises networks by a web proxy server. The web proxy server is a gateway that helps to secure the on-premises network from malicious devices or users in the off-premises network. Furthermore, the on-premises network may have a firewall that prevents the off-premises compute node from initiating a connection with the on-premises compute node.

Some embodiments further include the transport layer client service associated with the on-premises Web Socket application receiving a second transport layer segment from the transport layer server service associated with the on-premises server application through the transport layer socket, wherein the second transport layer segment is being sent from the on-premises server application to the off-premises client application. The on-premises WebSocket application may then encapsulate the second transport layer segment into a second application layer message and send the second application layer message to the off-premises Web Socket application through the Web Socket connection.

In some embodiments, the transport layer client service and the transport layer server service may communicate over the transport layer socket using a protocol selected from Transmission Control Protocol (TCP) and User Datagram Protocol (UDP). TCP implements a connection-oriented transfer mode that transfers information in a unit referred to as a segment. UDP implements connectionless communication that transfers information as datagrams.

Some embodiments provide a computer program product comprising a non-volatile computer readable medium and non-transitory program instructions embodied therein, the program instructions being configured to be executable by a processor on an on-premises compute node to cause the processor to perform various operations. The operations comprise hosting an off-premises Web Socket application that is an endpoint for a Web Socket connection between the off-premises WebSocket application and an on-premises WebSocket application hosted on a first on-premises compute node. The operations further comprise a transport layer server service associated with the off-premises WebSocket application receiving a first transport layer segment through a transport layer socket, wherein the transport layer segment is sent from an off-premises client application to an on-premises server application. Still further, the operations comprise the off-premises WebSocket application encapsulating the first transport layer segment into an application layer message and sending the application layer message to the on-premises Web Socket application through the Web Socket connection.

In some embodiments, the on-premises compute node is in an on-premises network having a firewall that prevents the off-premises compute node from initiating a connection with the on-premises compute node. Accordingly, the on-premises WebSocket application is responsible for initiating the establishment of the WebSocket connection with the off-premises WebSocket application before the off-premises WebSocket application is able to send the application layer message to the on-premises WebSocket application through the WebSocket connection. Specifically, the on-premises Web Socket application begins a handshake with the off-premises WebSocket application, where the handshake includes a process of negotiation between the two Web Socket applications through exchange of information that establishes the protocols of a communication link.

Some embodiments further include the off-premises WebSocket application receiving a second application layer message from the on-premises WebSocket application through the Web Socket connection, where the second application layer message encapsulates a second transport layer segment sent from the on-premises server application and directed to the off-premises client application. The second transport layer segment may be forwarded from the transport layer server service associated with the off-premises Web Socket application through the transport layer socket to the transport layer client service associated with the off-premises server application for delivery to the off-premises client application.

In some embodiments, the transport layer client service and the transport layer server service may communicate over the transport layer socket using a protocol selected from Transmission Control Protocol (TCP) and User Datagram Protocol (UDP). TCP implements a connection-oriented transfer mode that transfers information in a unit referred to as a segment. UDP implements connectionless communication that transfers information as datagrams.

Some embodiments provide a method comprising establishing a WebSocket connection between an on-premises WebSocket application hosted on a first on-premises compute node and an off-premises WebSocket application hosted on a first off-premises compute node, wherein the first on-premises compute node is in an on-premises network having a firewall that prevents the first off-premises compute node from initiating a connection with the first on-premises compute node, and wherein the on-premises WebSocket application hosted on the first on-premises compute node initiates the establishing of the WebSocket connection with the off-premises WebSocket application hosted on the first off-premises compute node. The method further comprises sending a message from a client application hosted on a second off-premises compute node to a server application hosted on a second on-premises compute node through the WebSocket connection, wherein the second off-premises compute node initiates the sending of the message to the second on-premises compute node. Optionally, the first and second on-premises compute nodes may be the same on-premises compute node and/or the first and second off-premises compute nodes may be the same off-premises compute node. Preferably, the on-premises Web Socket application hosted on the first on-premises compute node not only initiates the establishing of the WebSocket connection but also maintains the Web Socket connection in an active state.

In some embodiments, the Web Socket connection may traverse through the firewall and a web proxy server between the first on-premises compute node and the first off-premises compute node. In some embodiments, the method may further include allowing messages sent from the second off-premises compute node to the second on-premises compute node to reach the second on-premises compute node only if the messages are sent through the Web Socket connection.

In some embodiments, the method may include the first on-premises compute node receiving an instruction from an on-premises user, wherein the instruction identifies a network address for the first off-premises compute node and causes the on-premises Web Socket application hosted on the first on-premises compute node to initiate the establishing of the Web Socket connection with the off-premises Web Socket application hosted on the first off-premises compute node.

In some embodiments, the method may include sending a second message from the server application to the client application through the Web Socket connection. Accordingly, the same Web Socket connection may be used for full-duplex communication between the client application and the server application.

In some embodiments, the method may include sending messages from an additional client application hosted on an off-premises compute node through the Web Socket connection to the server application, from an additional server application hosted on an on-premises compute node through the Web Socket connection to the client application, and/or between the additional client application and the additional server application. The Web Socket connection may be used to support communication between one or more client applications hosted on one of more compute nodes in the off-premises environment and one or more server applications hosted on one or more compute nodes in the on-premises environment.

In some embodiments, the method may include establishing an off-premises transport layer socket between an off-premises transport layer client service associated with the client application hosted on the second off-premises compute node and an off-premises transport layer server service associated with the off-premises WebSocket application hosted on the first off-premises compute node. Similarly, the method may include establishing an on-premises transport layer socket between an on-premises transport layer server service associated with a server application hosted on the second on-premises compute node and an on-premises transport layer client service associated with the on-premises WebSocket application hosted on the first off-premises compute node.

In some embodiments, the off-premises transport layer client services and the off-premises transport layer server service may communicate over the off-premises transport layer socket using a protocol selected from Transmission Control Protocol and User Datagram Protocol. Similarly, the on-premises transport layer client services and the on-premises transport layer server service may communicate over the on-premises transport layer socket using a protocol selected from Transmission Control Protocol and User Datagram Protocol.

In some embodiments, the message sent from the client application to the server application is initiated by the client application and directed to the server application, sent over the off-premises transport layer socket from the off-premises transport layer client service associated with the client application to the off-premises transport layer server service associated with the off-premises Web Socket application, sent over the Web Socket connection from the off-premises Web Socket application to the on-premises Web Socket application, and sent over the on-premises transport layer socket from the on-premises transport layer client service associated with the on-premise WebSocket application to the on-premises transport layer server service associated with the server application. For example, the message may form at least one transport layer segment, and the message may be encapsulated in an Internet Protocol datagram.

In some embodiments, the transport layer server service associated with the off-premises Web Socket application may use a first destination port having the same port number as a second destination port used by the transport layer server service associated with the server application hosted by the on-premises compute node.

In some embodiments, the server application may send a reply message through the Web Socket connection to the client application, wherein the reply message sent from the server application to the client application is initiated by the server application and directed to the client application, sent over the on-premises transport layer socket from the on-premises transport layer server service associated with the server application to the on-premises transport layer client service associated with the on-premises WebSocket application, sent over the WebSocket connection from the on-premises WebSocket application to the off-premises WebSocket application, and sent over the off-premises transport layer socket from the off-premises transport layer server service associated with the off-premises WebSocket application to the off-premises transport layer client service associated with the client application.

The foregoing computer program products may further include program instructions for implementing or initiating any one or more operations of the methods described herein. Furthermore, any of the operations of the methods may be implemented or initiated by a computer program product by executing appropriate program instructions.

FIG. 1 is a diagram of a system 10 including a compute node 20 in an off-premises environment 12 in communication with a compute node 40 in an on-premises environment 14. The off-premises compute node 20 hosts a Web Socket application 22 and a client application 24. The off-premises Web Socket application 22 is associated with an OSI transport layer server service 26 and the client application 24 is associated with an OSI transport layer client service 28. In addition, an OSI transport layer socket (L4 OSI Stack) 30 has been opened to support communication of transport layer segments between the OSI transport layer server service 26 and the OSI transport layer client service 28. Accordingly, the client application 24 may communicate transport layer segments with the off-premises WebSocket application 22 by providing the transport layer segments to the OSI transport layer client service 28 and instructing the OSI transport layer client service 28 to send the segments over the OSI transport layer socket 30 to the transport layer server service 26 that is associated with the Web Socket application 22.

The on-premises compute node 40 hosts a WebSocket application 42 and a server application 44. The on-premises WebSocket application 42 is associated with an OSI transport layer client service 46 and the server application 44 is associated with an OSI transport layer server service 48. In addition, an OSI transport layer socket (L4 OSI Stack) 50 has been opened to support communication of transport layer segments between the OSI transport layer client service 46 and the OSI transport layer server service 48. Accordingly, the server application 44 may communicate transport layer segments with the on-premises WebSocket application 42 by providing the transport layer segments to the OSI transport layer server service 48 and instructing the OSI transport layer server service 48 to send the segments over the OSI transport layer socket 50 to the transport layer client service 26 that is associated with the Web Socket application 22.

A WebSocket (L7 OSI Stack) 16 has been established between the off-premises WebSocket application 22 and the on-premises WebSocket application 42. The WebSocket 16 is an application layer socket that supports full-duplex communication that is compatible with a public network 18, such as the Internet, and may traverse a web proxy server 41 that serves as a gateway between the on-premises environment (datacenter) 14 and the off-premises environment (cloud) 12. Furthermore, the public network 18 and other devices outside the on-premises environment 14 are considered to be off-premises.

For a first compute node to communicate with a second compute node, the first compute node can typically open a connection (socket) to the second compute node. However, if an off-premises compute node is attempting to open a connection with an on-premises compute node, a firewall protecting the on-premises environment will enforce firewall rules that prevent exposure of an on-premises compute node or other endpoint to the off-premises environment. Datacenter administrators do not want their datacenter to be exposed to the Internet and may distrust the Hypertext Transfer Protocol (HTTP) and the Hypertext Transfer Protocol Secure (HTTPS). Typically, internet access to the datacenter may be limited and controlled using a Web Proxy server in order to provide a level of separation between the on-premises environment (datacenter) and the off-premises environment outside of the datacenter. Therefore, for the off-premises compute node to communicate with the on-premises compute node, it is the on-premises compute node that must always initiate the connection or communication channel (socket). Accordingly, embodiments of the on-premises WebSocket application 42 are responsible for initiating the establishing of the WebSocket connection 16 with the off-premises WebSocket application 22 and also for maintaining the WebSocket connection 16 in an active state. The WebSocket connection 16 must be established and active before any transport layer segments may be sent through the WebSocket connection between a client application 24 and a server application 44. The WebSocket connection using the WebSocket communications protocol, which is an enhancement and upgrade to the HTTP protocol, works very well on the standard HTTP(S) 80 (443) ports and can work through Web Proxy servers.

In one example, an on-premises user may access a user-interface (UI) of the server application 44 hosted on the on-premises compute node 40 and specify the address of the off-premises compute node 20 to which the user wants the on-premises compute node 40 to form the WebSocket connection 16. Accordingly, the WebSocket connection between the on-premises compute node and the designated off-premises compute node is established or formed. After being established, the WebSocket connection may then support communications (i.e., sending messages) in either direction (i.e., either from the on-premises compute node to the off-premises compute node or from off-premises compute node to the on-premises compute node). Because the Web Socket connection supports full-duplex communication, the Web Socket connection may be considered a simple Open Systems Interconnect (OSI) Stack Layer 7 connection, and this WebSocket connection allows the off-premises compute node 20 to be programmatically bound to its own transport layer socket 30 and allows the on-premises compute node 40 to be programmatically bound to its own transport layer socket 50. Beneficially, the WebSocket 16 works as an application layer (L7) gateway for the client application 24 to communicate with the server application 44.

Example

In one specific and non-limiting example, an off-premises compute node 20 needs to collect data from an on-premises compute node 40 because of a request from a user on the off-premises compute node 20, such as a cloud portal. For example, the user of the off-premises compute node 20 may cause the off-premises compute node 20 to communicate with the on-premises compute node 40 to initiate a firmware update of the off-premises compute node 20. In order for the off-premises compute node 20 to communicate with the on-premises compute node 40 using a protocol X, such as TCP or UDP, which uses port P, the on-premises compute node 40 must first initiate establishing of the WebSocket 16 with the off-premises compute node 20. Accordingly, a WebSocket application 42 is hosted on the on-premises compute node 40 and performs a handshake with a WebSocket application 22 hosted on the off-premises compute node 20. After the WebSocket 16 between the on-premises WebSocket application 42 and the off-premises WebSocket application 22 is active, communication between a client application 24 hosted on the off-premises compute node 20 and a server application 44 hosted on the on-premises compute node 40 may proceed in the following manner.

1. Upon request of the user of the off-premises compute node 20, the off-premises WebSocket application 22 opens a transport layer server service 26 on port P and the client application 24 opens a transport layer client service 28. The transport layer server service 26 and the transport layer client service 28 then form a transport layer socket 30 to support communication therebetween. Specifically, the transport layer socket 30 supports communication between the client application 24 associated with the transport layer client service 28 and the off-premises WebSocket application 22 associated with the transport layer server service 26.

2. The off-premises compute node 20 receives a byte stream from the user through the client application 24, such as a request for a firmware update on the off-premises compute node 20. The request is transferred from the client application 24 through the transport layer socket 30 to the off-premises WebSocket application 22, which forwards the byte stream on port P through the WebSocket 16 using the optional format: <destination details><client bytes>. For example, the off-premises compute node 20 may execute a call to the off-premises compute node 20 at port P in the same manner that the off-premises compute node 20 would communicate to port P of the on-premises compute node 40. However, the call is directed to the off-premises compute node 20 itself and causes the off-premises WebSocket application 22 to send the message (byte stream) from off-premises compute node 20 to the on-premises compute node 40 via the WebSocket 16. In the present example, the client application 24 may be a browser that the user has authenticated into the off-premises compute node to run commands against the on-premises compute node 40, such as to update firmware on off-premises compute node 20 using firmware made available by a server application 44 hosted by the on-premises compute node 40.

3. The WebSocket application 42 hosted on the on-premises compute node 40 receives the message (byte stream) from the WebSocket 16 as <destination details><client bytes> and opens a transport layer connection (socket) 50 to itself on port P. This is similar to the way that the off-premises compute node opened a transport layer connection to itself on port P.

4. The WebSocket application 42 forwards the byte stream on this new transport layer connection 50 to the server application 44 running on the on-premises compute node 40 to provide services, such as a service that performs firmware updates on servers, such as compute node 20 and other compute nodes in the off-premises environment 12.

5. The on-premises WebSocket application 42 receives a reply from the server application 44 via the transport layer socket 50 (i.e., the connection between the transport layer client service 46 and the transport layer server service 48) and then pushes the reply byte stream (a reply byte stream that is responsive to the request byte stream previous sent by off-premises compute node) through the WebSocket 16 to the off-premises WebSocket application 22 as: <reply details><reply bytes> For example, the reply byte stream may indicate that the server application 44 has initiated the requested firmware update or may provide the firmware update to the compute node 20 for installation. Optionally, the transport layer socket and services may use the Transmission Control Protocol (TCP) or the User Datagram Protocol (UDP).

6. The off-premises WebSocket application 22 receives the byte stream from the on-premises WebSocket application 42 via the WebSocket 16 and then forwards the byte stream over its own transport layer socket 30 to the client application 24. It is a technological advantage that the client application 24 receives the reply bytes over the transport layer socket 30 (i.e., the connection between the transport layer server service 26 and the transport layer client service 28) of the off-premises compute node 20 in the same manner as it would normally receive a reply if the off-premises compute node 20 was able to directly communicate with the on-premises compute node 40.

The WebSocket is an L7 OSI Stack element, and because of this, the protocol and port are already established. The Web Socket is used as a byte tunnel between the off-premises and on-premises compute nodes to support communication from the off-premises compute node to the on-premises compute node or from the on-premises compute node to the off-premises compute node using any communication protocol. A transport layer socket is required at each end (off-premises and on-premises compute nodes) to enable the communication in a transport layer (L4) protocol, such as TCP or UDP, to be encapsulated and transported through the Web Socket connection using an application layer (L7) protocol.

Figure 2:
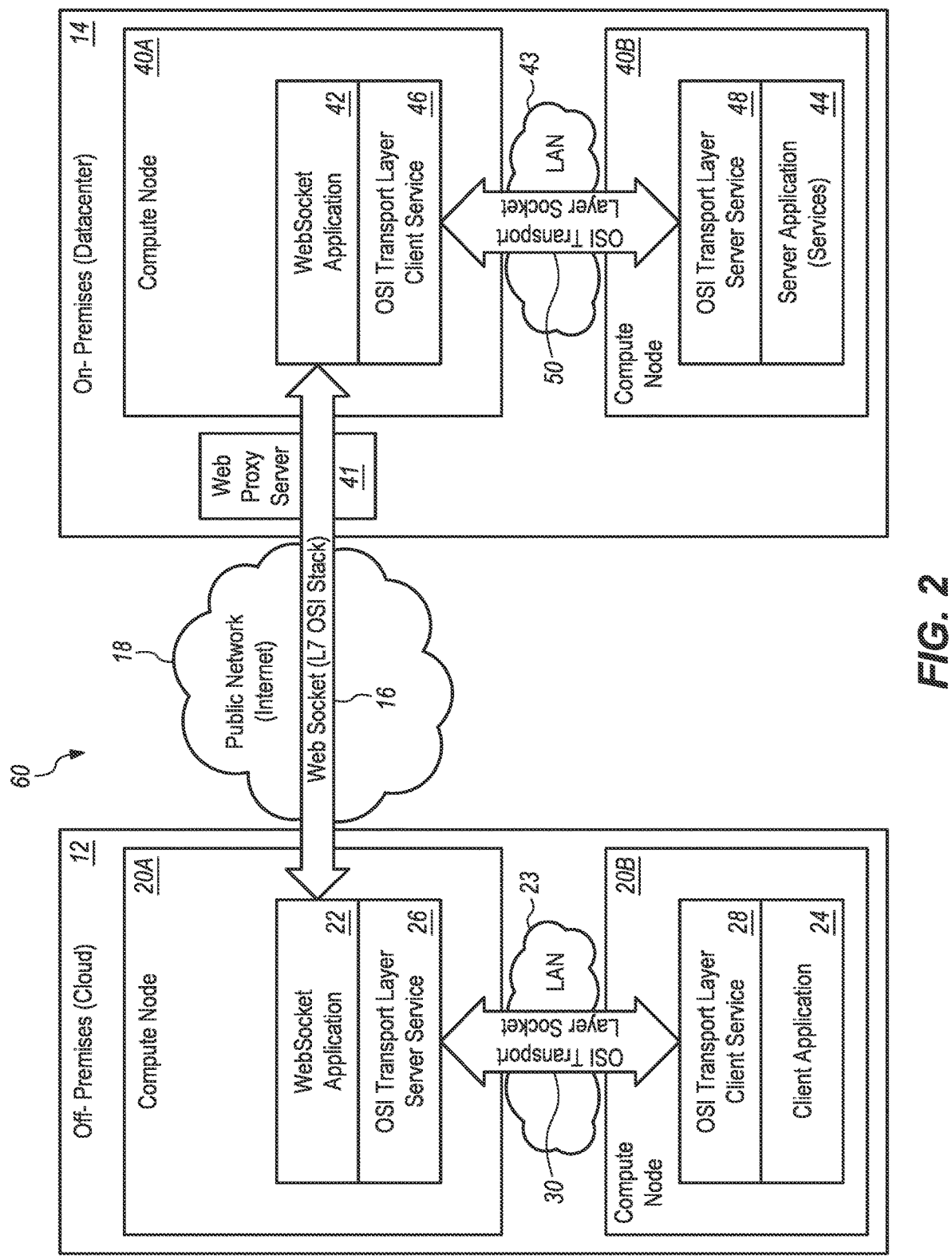
FIG. 2 is a diagram of a system including an off-premises environment including a compute node with a Web Socket application and another compute node with a client application in communication with a compute node in an on-premises environment.

FIG. 2 is a diagram of a system 60 including the off-premises environment 12 and the on-premises environment 14 of FIG. 1. Many aspects of the system 60 are the same as in system 10 of FIG. 1 and the same reference numbers are used to references the same elements. However, system 60 shows the off-premises environment 12 including a first compute node 20A hosting the off-premises WebSocket application 22 and a second compute node 20B hosting the client application 24. Similarly, the on-premises environment 14 is shown including a first compute node 40A hosting the on-premises WebSocket application 42 and a second compute node 40B hosting the server application 44.

In the off-premises environment 12, the transport layer client service 28 is opened by the client application 24 and is similarly hosted by the second compute node 20B. The transport layer server service 26 is opened by the WebSocket application 22 and is similarly hosted by the first compute node 20A. Therefore, the transport layer socket 30 transverses a network 23, such as a local area network. This highlights the flexibility of having a single off-premises WebSocket application 22 that can provide access to the WebSocket 16 for either a client application hosted by the same compute node 20 as the Web Socket application 22 (See FIG. 1) or a client application hosted by a compute node 20B other than the compute node 20A that hosts the Web Socket application 22 (See FIG. 2).

In the on-premises environment 14, the transport layer client service 46 is opened by the WebSocket application 42 and is similarly hosted by the first compute node 40A. The transport layer server service 48 is opened by the server application 44 and is similarly hosted by the second compute node 40B. Therefore, the transport layer socket 50 transverses a network 43, such as a local area network. This highlights the flexibility of having a single on-premises WebSocket application 42 that can provide access to the WebSocket 16 for either a server application hosted by the same compute node 40 as the Web Socket application 42 (See FIG. 1) or a client application hosted by a compute node 40B other than the compute node 40A that hosts the Web Socket application 42 (See FIG. 2). Other aspects of the system 60 may function in the same manner as the system 10 and other embodiments disclosed herein.

Figure 3:
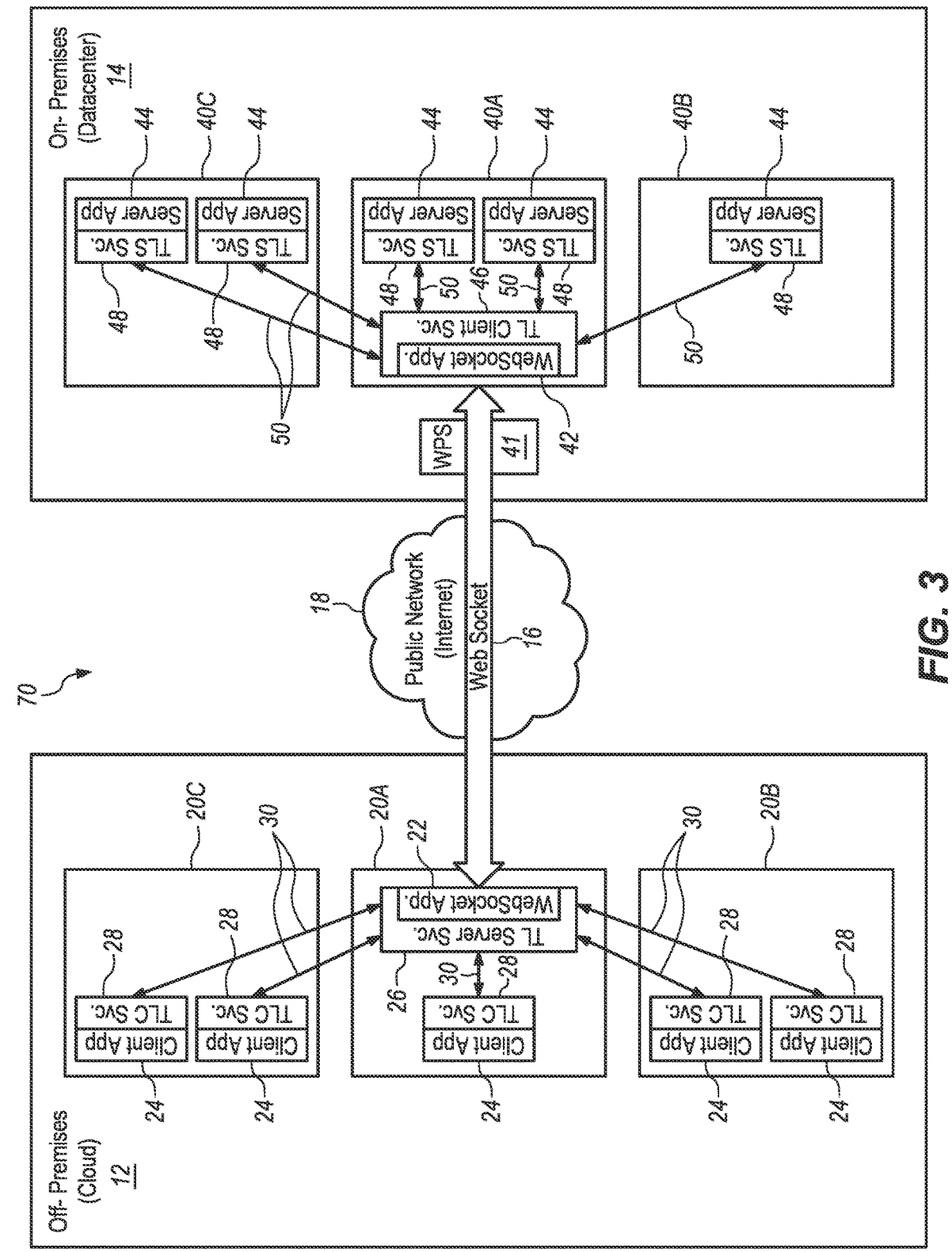
FIG. 3 is a diagram of a system including an off-premises environment having multiple client applications hosted by multiple compute nodes and an on-premises environment having multiple server applications hosted by multiple compute nodes, where the multiple client applications and the multiple server applications are able to communicate over a Web Socket application between a Web Socket application hosted by one of the compute nodes in the off-premises environment and a Web Socket application hosted by one of the compute nodes in the on-premises environment.

FIG. 3 is a diagram of a system 70 including the off-premises environment 12 having multiple client applications 24 hosted by multiple compute nodes 20A-C and the on-premises environment 14 having multiple server applications 44 hosted by multiple compute nodes 40A-C. The multiple client applications 24 and the multiple server applications 44 are able to communicate over the Web Socket 16 between a Web Socket application 22 hosted by one of the compute nodes (compute node 20A) in the off-premises environment 12 and a WebSocket application 42 hosted by one of the compute nodes (compute node 40A) in the on-premises environment 14. Other aspects of the system 70 may function in the same manner as the system 10 in FIG. 1, the system 60 in FIG. 2, and/or other embodiments disclosed herein. Specifically, the transport layer sockets 30 between each transport layer client service 28 and the transport layer server service 26 may function in same manner described elsewhere herein, and the transport layer sockets 50 between each transport layer server service 48 and the transport layer server service 46 may function in same manner described elsewhere herein.

Embodiments may minimize the number of ports needed since traffic between the one or more client applications 24 on the off-premises node(s) and one or more of the server applications 44 on the on-premises node(s) can be multiplexed through the same WebSocket 16. This allows communication using multiple protocols for multiple services to occur through only one WebSocket 16. As one example, an on-premises XClarity system management software may perform various functions that require a connection to external services. Specifically, these functions may include a ticketing service for opening service tickets, a log upload facility for uploading log files, and a repository for retrieving firmware update packages. Optionally, traffic for all these functions can be done through a single port utilized by the Web Socket connection 16, instead of requiring a separate port for each function.

Figure 4:
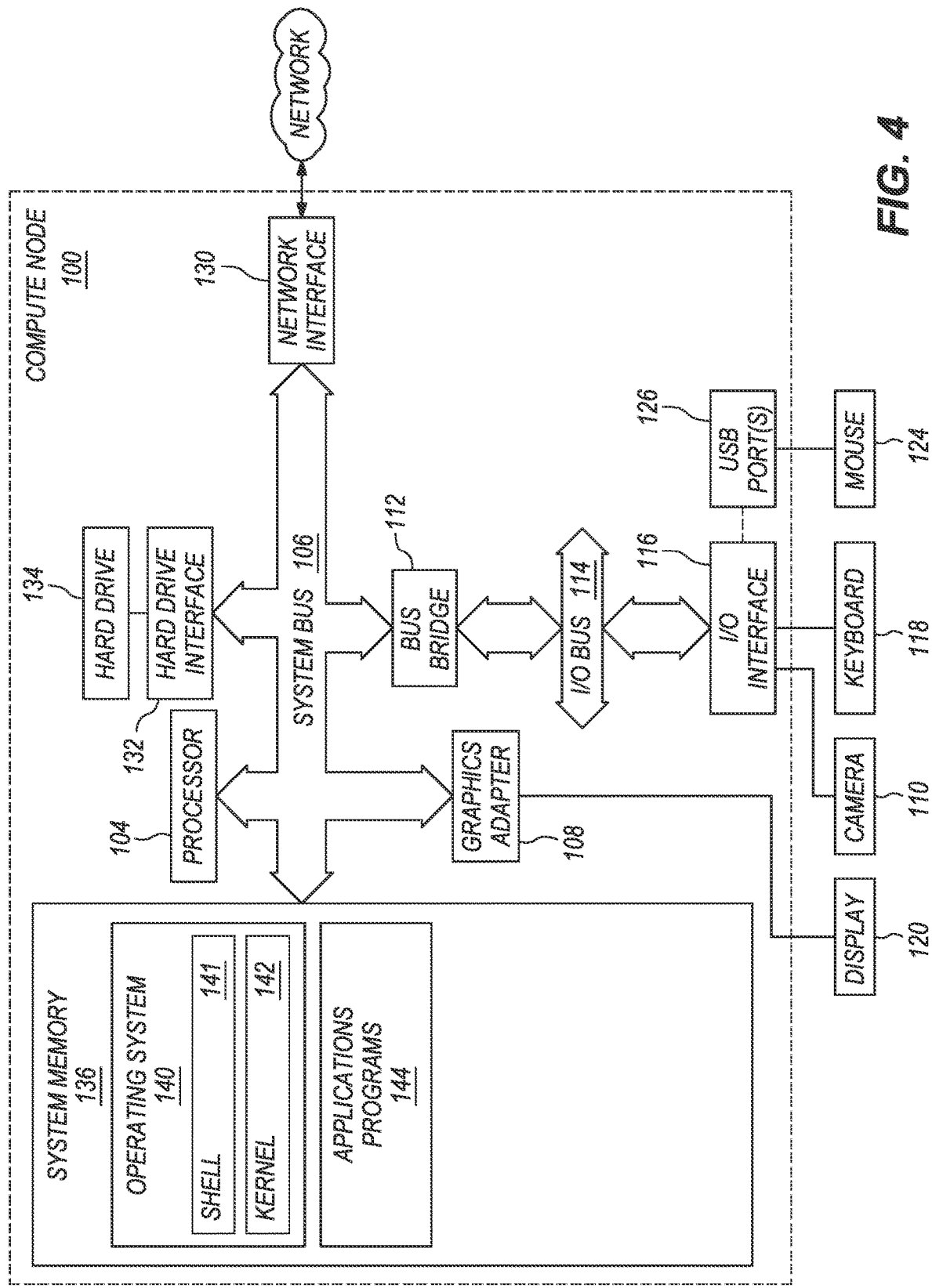
FIG. 4 is a diagram of a compute node that is a non-limiting example of a compute node in the off-premises environment and/or the on-premises environment.

FIG. 4 is a diagram of a compute node 100, such as a server, that may be representative of the compute nodes 20, 40, including compute nodes 20A-C, 40A-C, in the off-premises environment 12 and/or the on-premises environment 14 shown in FIGS. 1-3. The compute node 100 includes a processor unit 104 that is coupled to a system bus 106. The processor unit 104 may utilize one or more processors, each of which has one or more processor cores. An optional graphics adapter 108, which may drive/support an optional display 120, is also coupled to system bus 106. The graphics adapter 108 may, for example, include a graphics processing unit (GPU). The system bus 106 may be coupled via a bus bridge 112 to an input/output (I/O) bus 114. An I/O interface 116 is coupled to the I/O bus 114, where the I/O interface 116 affords a connection with various optional I/O devices, such as a camera 110, a keyboard 118 (such as a touch screen virtual keyboard), and a USB mouse 124 via USB port(s) 126 (or other type of pointing device, such as a trackpad). As depicted, the compute node 100 is able to communicate with other compute nodes or other devices over a network, such as networks 18, 23, 43 shown in FIGS. 1-3, using a network adapter or network interface controller 130.

A hard drive interface 132 is also coupled to the system bus 106. The hard drive interface 132 interfaces with a hard drive 134. In a preferred embodiment, the hard drive 134 may communicate with system memory 136, which is also coupled to the system bus 106. The system memory may be volatile or non-volatile and may include additional higher levels of volatile memory (not shown), including, but not limited to, cache memory, registers and buffers. Data that populates the system memory 136 may include the operating system (OS) 140 and application programs 144. The hardware elements depicted in the compute node 100 are not intended to be exhaustive, but rather are representative.

The operating system 114 includes a shell 141 for providing transparent user access to resources such as application programs 144. Generally, the shell 141 is a program that provides an interpreter and an interface between the user and the operating system. More specifically, the shell 141 may execute commands that are entered into a command line user interface or from a file. Thus, the shell 141, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 141 may be a text-based, line-oriented user interface, the present invention may support other user interface modes, such as graphical, voice, gestural, etc.

As depicted, the operating system 140 also includes the kernel 142, which includes lower levels of functionality for the operating system 140, including providing essential services required by other parts of the operating system 140 and application programs 144. Such essential services may include memory management, process and task management, disk management, and mouse and keyboard management. In addition, the computer 100 may include application programs 144 stored in the system memory 136. For the example, the applications programs 144 may include one or more client applications, one or more server applications, and/or a Web Socket application. Optionally, the transport layer client and server services may be provided by the operating system 140.

FIG. 5 is a flowchart of operations 150 for a system including an on-premises compute node and an off-premises compute node. Operation 152 includes establishing a WebSocket connection between an on-premises Web Socket application hosted on a first on-premises compute node and an off-premises WebSocket application hosted on a first off-premises compute node, wherein the first on-premises compute node is in an on-premises network having a firewall that prevents the first off-premises compute node from initiating a connection with the first on-premises compute node, and wherein the on-premises WebSocket application hosted on the first on-premises compute node initiates the establishing of the WebSocket connection with the off-premises WebSocket application hosted on the first off-premises compute node. Operation 154 includes sending a message from a client application hosted on a second off-premises compute node to a server application hosted on a second on-premises compute node through the Web Socket connection, wherein the second off-premises compute node initiates the sending of the message to the second on-premises compute node.

Figure 6:
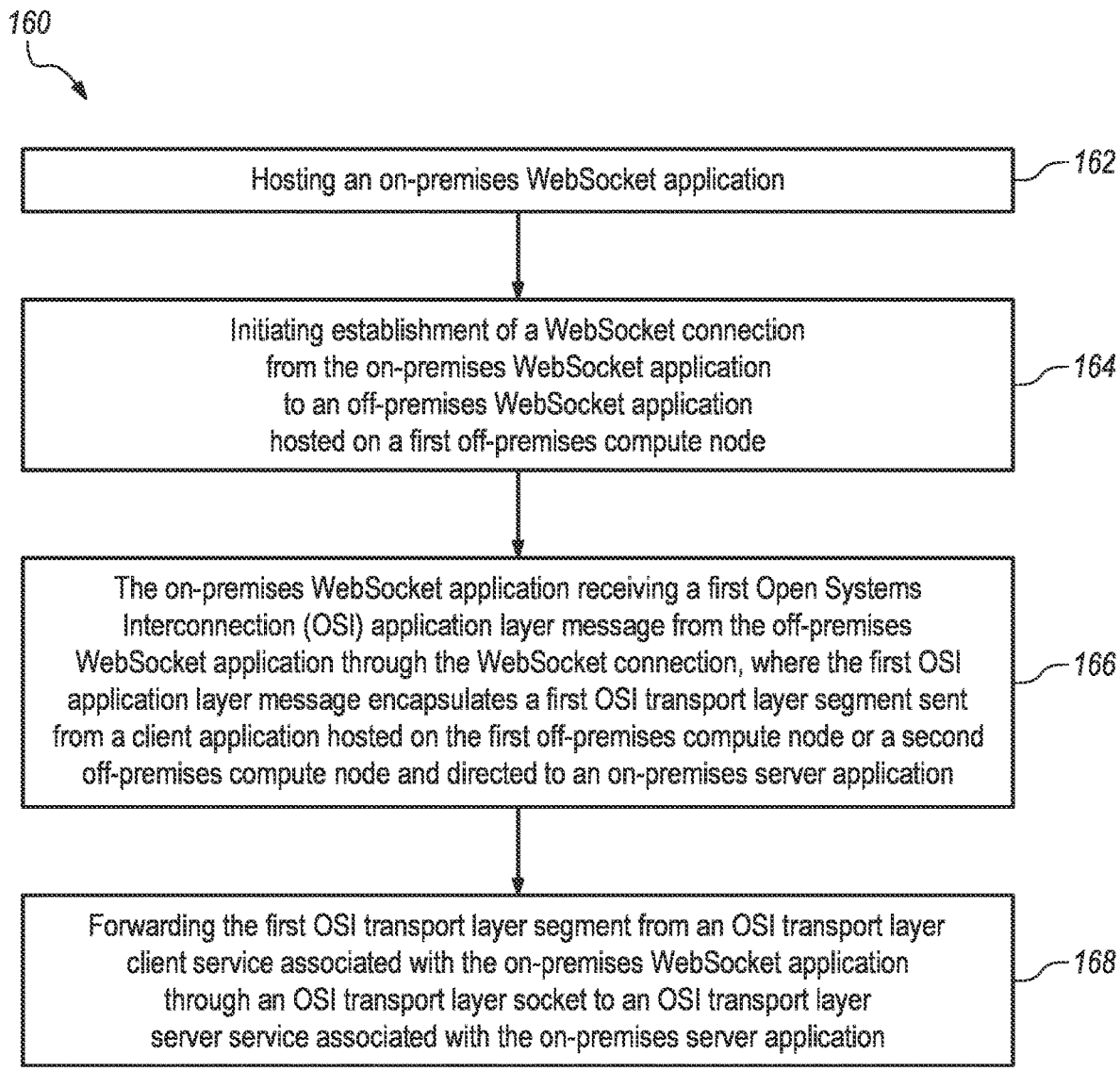
FIG. 6 is a flowchart of operations for an on-premises compute node.

FIG. 6 is a flowchart of operations 160 for an on-premises compute node. Operation 162 includes hosting an on-premises WebSocket application. Operation 164 includes initiating establishment of a Web Socket connection from the on-premises Web Socket application to an off-premises WebSocket application hosted on a first off-premises compute node. Operation 166 includes the on-premises Web- Socket application receiving a first Open Systems Interconnection (OSI) application layer message from the off-premises WebSocket application through the WebSocket connection, where the first OSI application layer message encapsulates a first OSI transport layer segment sent from a client application hosted on the first off-premises compute node or a second off-premises compute node and directed to an on-premises server application. Operation 168 includes forwarding the first OSI transport layer segment from an OSI transport layer client service associated with the on-premises Web Socket application through an OSI transport layer socket to an OSI transport layer server service associated with the on-premises server application.

Figure 7:
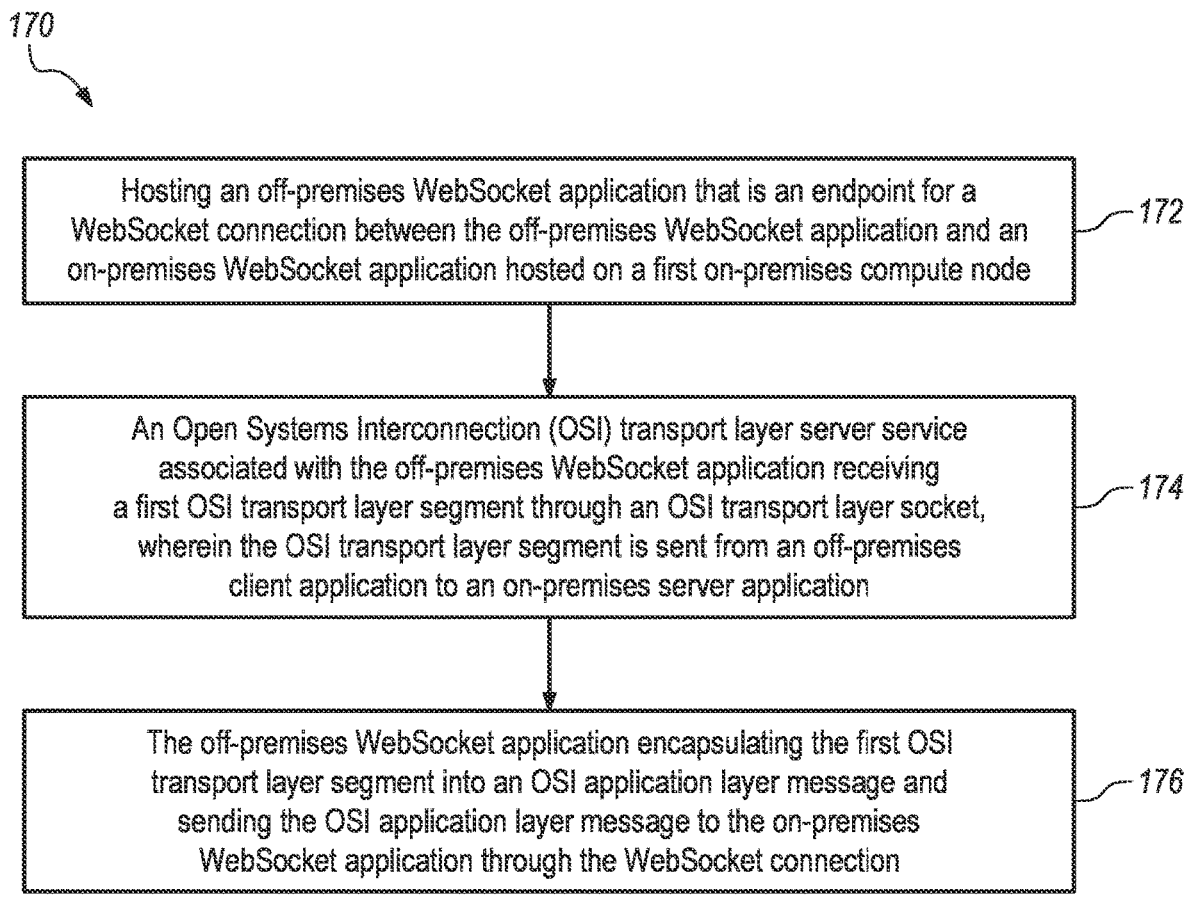
FIG. 7 is a flowchart of operations for an off-premises compute node.

FIG. 7 is a flowchart of operations 170 for an off-premises compute node. Operation 172 includes hosting an off-premises WebSocket application that is an endpoint for a WebSocket connection between the off-premises WebSocket application and an on-premises WebSocket application hosted on a first on-premises compute node. Operation 174 includes an Open Systems Interconnection (OSI) transport layer server service associated with the off-premises WebSocket application receiving a first OSI transport layer segment through an OSI transport layer socket, wherein the OSI transport layer segment is sent from an off-premises client application to an on-premises server application. Operation 176 includes the off-premises WebSocket application encapsulating the first OSI transport layer segment into an OSI application layer message and sending the OSI application layer message to the on-premises Web Socket application through the Web Socket connection.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing.

Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer readable medium and program instructions embodied therein, the program instructions being configured to be executable by a processor on an on-premises compute node to cause the processor to perform operations comprising:
    hosting an on-premises WebSocket application;
    initiating establishment of a WebSocket connection from the on-premises WebSocket application to an off-premises WebSocket application hosted on a first off-premises compute node, wherein the on-premises compute node is in an on-premises network having a firewall that prevents off-premises compute nodes from initiating a connection with the on-premises compute node;
    the on-premises WebSocket application receiving a first application layer message from the off-premises WebSocket application through the WebSocket connection, where the first application layer message encapsulates a first transport layer segment sent from a client application hosted on the first off-premises compute node or a second off-premises compute node and directed to an on-premises server application; and
    forwarding the first transport layer segment from a transport layer client service associated with the on-premises WebSocket application through a transport layer socket to a transport layer server service associated with the on-premises server application.

2. The computer program product of claim 1, further comprising:
    the transport layer client service associated with the on-premises WebSocket application receiving a second transport layer segment from the transport layer server service associated with the on-premises server application through the transport layer socket, wherein the second transport layer segment is being sent from the on-premises server application to the off-premises client application; and
    the on-premises WebSocket application encapsulating the second transport layer segment into a second application layer message and sending the second application layer message to the off-premises WebSocket application through the WebSocket connection.

3. The computer program product of claim 1, wherein the transport layer client service and the transport layer server service communicate over the transport layer socket using a protocol selected from Transmission Control Protocol and User Datagram Protocol.

4. A computer program product comprising a non-transitory computer readable medium and program instructions embodied therein, the program instructions being configured to be executable by a processor on an off-premises compute node to cause the processor to perform operations comprising:
    hosting an off-premises WebSocket application that is an endpoint for a WebSocket connection between the off-premises WebSocket application and an on-premises WebSocket application hosted on a first on-premises compute node, wherein the on-premises compute node is in an on-premises network having a firewall that prevents the off-premises compute node from initiating a connection with the on-premises compute node;
    a transport layer server service associated with the off-premises WebSocket application receiving a first transport layer segment through a transport layer socket, wherein the transport layer segment is sent from an off-premises client application to an on-premises server application; and
    the off-premises WebSocket application encapsulating the first transport layer segment into an application layer message and sending the application layer message to the on-premises WebSocket application through the WebSocket connection.

5. The computer program product of claim 4, further comprising:
    the off-premises WebSocket application receiving a second application layer message from the on-premises WebSocket application through the WebSocket connection, where the second application layer message encapsulates a second transport layer segment sent from the on-premises server application and directed to the off-premises client application; and
    forwarding the second transport layer segment from the transport layer server service associated with the off-premises WebSocket application through the transport layer socket to the transport layer client service associated with the off-premises server application for delivery to the off-premises client application.

6. A method, comprising:
    establishing a WebSocket connection between an on-premises WebSocket application hosted on a first on-premises compute node and an off-premises WebSocket application hosted on a first off-premises compute node, wherein the first on-premises compute node is in an on-premises network having a firewall that prevents the first off-premises compute node from initiating a connection with the first on-premises compute node, and wherein the on-premises WebSocket application hosted on the first on-premises compute node initiates the establishing of the WebSocket connection with the off-premises WebSocket application hosted on the first off-premises compute node; and
    sending a message from a client application hosted on a second off-premises compute node to a server application hosted on a second on-premises compute node through the WebSocket connection, wherein the second off-premises compute node initiates the sending of the message to the second on-premises compute node.

7. The method of claim 6, wherein the first and second on-premises compute nodes are the same on-premises compute node and/or the first and second off-premises compute nodes are the same off-premises compute node.

8. The method of claim 6, wherein the WebSocket connection traverses through the firewall and a web proxy server between the first on-premises compute node and the first off-premises compute node.

9. The method of claim 8, further comprising:
the first on-premises node maintaining the WebSocket connection in an active state.

10. The method of claim 6, further comprising:
the first on-premises compute node receiving an instruction from an on-premises user, wherein the instruction identifies a network address for the first off-premises compute node and causes the on-premises WebSocket application hosted on the first on-premises compute node to initiate the establishing of the WebSocket connection with the off-premises WebSocket application hosted on the first off-premises compute node.

11. The method of claim 6, further comprising:
allowing messages sent from the second off-premises compute node to the second on-premises compute node to reach the second on-premises compute node only if the messages are sent through the WebSocket connection.

12. The method of claim 6, further comprising:
sending a second message from the server application to the client application through the WebSocket connection.

13. The method of claim 6, further comprising:
sending messages from an additional client application hosted on an off-premises compute node through the WebSocket connection to the server application, from an additional server application hosted on an on-premises compute node through the WebSocket connection to the client application, and/or between the additional client application and the additional server application.

14. The method of claim 6, further comprising:
establishing an off-premises transport layer socket between an off-premises transport layer client service associated with the client application hosted on the second off-premises compute node and an off-premises transport layer server service associated with the off-premises WebSocket application hosted on the first off-premises compute node; and
establishing an on-premises transport layer socket between an on-premises transport layer server service associated with a server application hosted on the second on-premises compute node and an on-premises transport layer client service associated with the on-premises WebSocket application hosted on the first off-premises compute node.

15. The method of claim 14, wherein the off-premises transport layer client services and the off-premises transport layer server service communicate over the off-premises transport layer socket using a protocol selected from Transmission Control Protocol and User Datagram Protocol, and wherein the on-premises transport layer client services and the on-premises transport layer server service communicate over the on-premises transport layer socket using a protocol selected from Transmission Control Protocol and User Datagram Protocol.

16. The method of claim 14, wherein the message sent from the client application to the server application is initiated by the client application and directed to the server application, sent over the off-premises transport layer socket from the off-premises transport layer client service associated with the client application to the off-premises transport layer server service associated with the off-premises WebSocket application, sent over the WebSocket connection from the off-premises WebSocket application to the on-premises WebSocket application, and sent over the on-premises transport layer socket from the on-premises transport layer client service associated with the on-premise WebSocket application to the on-premises transport layer server service associated with the server application.

17. The method of claim 16, wherein the message forms at least one transport layer segment, and wherein the message is encapsulated in an Internet Protocol datagram.

18. The method of claim 16, wherein the transport layer server service associated with the off-premises WebSocket application uses a first destination port having the same port number as a second destination port used by the transport layer server service associated with the server application hosted by the on-premises compute node.

* * * * *